US009316110B2

(12) United States Patent
Cottom et al.

(10) Patent No.: US 9,316,110 B2
(45) Date of Patent: Apr. 19, 2016

(54) HIGH POROSITY ABRADABLE COATING

(71) Applicant: SOLAR TURBINES INCORPORATED, San Diego, CA (US)

(72) Inventors: Brent Allen Cottom, San Diego, CA (US); Michael Andrew Coe, El Cajon, CA (US)

(73) Assignee: Solar Turbines Incorporated, San Diego, CA (US)

( * ) Notice: Subject to any disclaimer, the term of this patent is extended or adjusted under 35 U.S.C. 154(b) by 434 days.

(21) Appl. No.: 13/962,701

(22) Filed: Aug. 8, 2013

(65) Prior Publication Data

US 2015/0044035 A1 Feb. 12, 2015

(51) Int. Cl.
*F01D 11/12* (2006.01)
*B32B 7/02* (2006.01)
*B32B 15/04* (2006.01)
*C23C 28/00* (2006.01)

(52) U.S. Cl.
CPC .......... *F01D 11/122* (2013.01); *C23C 28/3215* (2013.01); *C23C 28/3455* (2013.01); *F05D 2300/514* (2013.01); *Y10T 428/24967* (2015.01)

(58) Field of Classification Search
CPC .............. F01D 11/122; C23C 28/3455; C23C 28/3215; Y10T 428/24967; F05D 2300/514
USPC ........ 415/173.4; 428/332, 334, 335, 215, 457
See application file for complete search history.

(56) References Cited

U.S. PATENT DOCUMENTS 4,299,865 A * 11/1981 Clingman ............ F01D 11/122 427/243
4,503,130 A * 3/1985 Bosshart .................. C23C 4/02 428/535
4,936,745 A 6/1990 Vine et al.
6,190,124 B1 * 2/2001 Freling ................ C23C 28/321 415/173.4
6,537,021 B2 3/2003 Howard et al.
7,150,921 B2 12/2006 Nelson et al.
7,981,530 B2 7/2011 Sporer et al.
8,357,454 B2 1/2013 Kulkarni et al.
2004/0067317 A1 4/2004 Gorman
2006/0151856 A1 * 7/2006 Torigoe .................. C23C 4/105 257/632
2010/0247953 A1 * 9/2010 Bossmann ........... C04B 37/005 428/623
2011/0027573 A1 2/2011 Strock et al.
2012/0063888 A1 * 3/2012 Strock ..................... C23C 28/04 415/173.4
2012/0099970 A1 4/2012 Strock et al.

FOREIGN PATENT DOCUMENTS

| | | |
|---|---|---|
| JP | 2005179779 | 7/2005 |
| JP | 2008119727 | 5/2008 |
| JP | 2011149419 | 8/2011 |
| KR | 1020080072701 | 8/2008 |
| WO | WO2005071228 | 8/2005 |
| WO | WO2013001091 | 1/2013 |

* cited by examiner

*Primary Examiner* — Hoang Nguyen
(74) *Attorney, Agent, or Firm* — Procopio, Cory, Hargeaves & Savitch LLP

(57) ABSTRACT

An abradable coating for a gas turbine engine includes a bond coat, an intermediate layer, and a porous layer. The bond coat includes a metal coating and a thickness from 0.152 millimeters to 0.229 millimeters. The intermediate layer includes a ceramic material and a thickness from 0.051 millimeters to 0.381 millimeters. The porous layer includes a porous ceramic material. The porous layer also includes a porosity greater than thirty-five percent of a volume of the porous layer. The porous layer further includes a thickness from 0.127 millimeters to 1.524 millimeters.

20 Claims, 3 Drawing Sheets

HIGH POROSITY ABRADABLE COATING

TECHNICAL FIELD

The present disclosure generally pertains to gas turbine engines, and is more particularly directed toward a high porosity abradable coating for gas turbine engine components such as a tip shoe adjacent bare rotor blades.

BACKGROUND

Gas turbine engines include compressor, combustor, and turbine sections. Components of the compressor, combustor, and turbine sections are often coated with abradable coatings and/or thermal barrier coatings. U.S. patent application publication No. 2012/0062888 to C. Strock discloses an abradable coating for interaction with tips of airfoils (such as vanes or blades of a compressor of a gas turbine engine) that includes a metal bond coat thermal, ceramic layer, and an abradable layer. The ceramic layer on the metal bond coat provides insulation and acts as a fuse that is adapted to spall off upon high rub interaction. The abradable coating on the ceramic layer contacts the tips of the airfoils during operation of the compressor. The abradable coating is sufficiently abradable to roundup the coating by contact with airfoil tips.

The present disclosure is directed toward overcoming one or more of the problems discovered by the inventors or that is known in the art.

SUMMARY OF THE DISCLOSURE

An abradable coating for a gas turbine engine is disclosed. The abradable coating includes a bond coat, an intermediate layer, and a porous layer. The bond coat is applied to a substrate. The bond coat includes a metal coating and a thickness from 0.152 millimeters to 0.229 millimeters. The intermediate layer is applied to the bond coat. The intermediate layer includes a ceramic material and a thickness from 0.051 millimeters to 0.381 millimeters. The porous layer is applied to the intermediate layer. The porous layer includes a porous ceramic material. The porous layer also includes a porosity greater than thirty-five percent of a volume of the porous layer. The porous layer further includes a thickness from 0.127 millimeters to 1.524 millimeters.

DETAILED DESCRIPTION

The systems and methods disclosed herein include an abradable coating for gas turbine engine components. In embodiments, the abradable coating includes a bond coat, an intermediate layer, and a porous layer. The bond coat includes a metallic material, the intermediate layer includes a ceramic material, and the porous layer includes a ceramic material with a porosity, for example, above 35% of its volume. The bond coat and intermediate layer may provide support and structure for the porous layer. The intermediate layer may also improve the durability of the abradable coating. The porous layer may reduce the wear on turbine blades with a bare metal tip or turbine blades without an abrasive ceramic tip.

Figure 1:
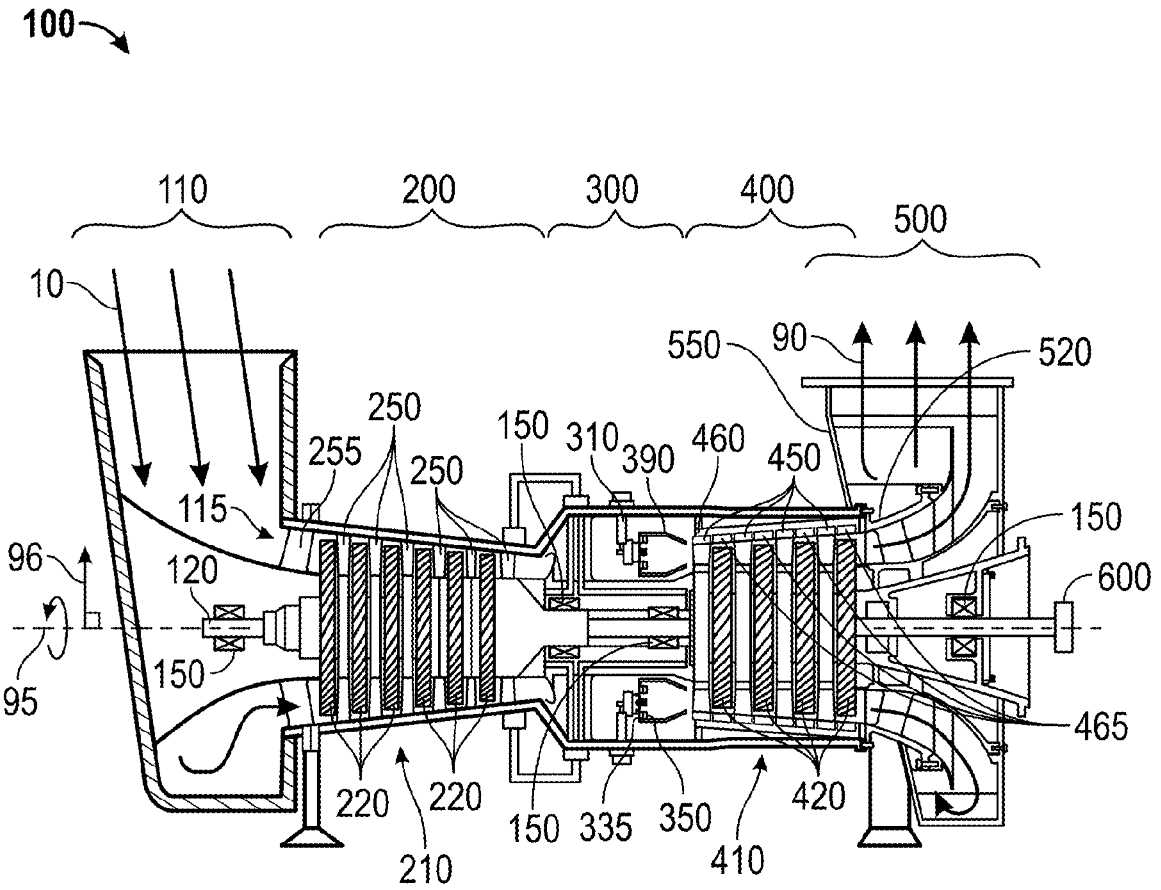
FIG. 1 is a schematic illustration of an exemplary gas turbine engine.

FIG. 1 is a schematic illustration of an exemplary gas turbine engine 100. Some of the surfaces have been left out or exaggerated (here and in other figures) for clarity and ease of explanation. Also, the disclosure may reference a forward and an aft direction. Generally, all references to “forward” and “aft” are associated with the flow direction of primary air (i.e., air used in the combustion process), unless specified otherwise. For example, forward is “upstream” relative to primary air flow, and aft is “downstream” relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as “inner” and “outer” generally indicate a lesser or greater radial distance from, wherein a radial 96 may be in any direction perpendicular and radiating outward from center axis 95.

A gas turbine engine 100 includes an inlet 110, a shaft 120, a compressor 200, a combustor 300, a turbine 400, an exhaust 500, and a power output coupling 600. The gas turbine engine 100 may have a single shaft or a dual shaft configuration.

The compressor 200 includes a compressor rotor assembly 210, compressor stationary vanes (stators) 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes one or more fuel injectors 310 and includes one or more combustion chambers 390. The fuel injectors 310 may be annularly arranged about center axis 95.

The turbine 400 includes a turbine rotor assembly 410, turbine nozzles 450, and a turbine housing 460. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk 425 (illustrated in FIG. 2) that is circumferentially populated with turbine blades 430 (illustrated in FIG. 2). Turbine nozzles 450 axially precede each of the turbine disk assemblies 420. Each turbine disk assembly 420 paired with the adjacent turbine nozzles 450 that precede the turbine disk assembly 420 is considered a turbine stage. Turbine 400 includes multiple turbine stages. Turbine housing 460 is located radially outward from turbine rotor assembly 410 and turbine nozzles 450. Turbine nozzles 450 may be supported by or coupled to turbine housing 460. Turbine 400 may also include tip shoes 465. Tip shoes 465 may be supported by or coupled to turbine housing 460 adjacent to or between turbine nozzles 450.

The exhaust 500 includes an exhaust diffuser 520 and an exhaust collector 550.

Figure 2:
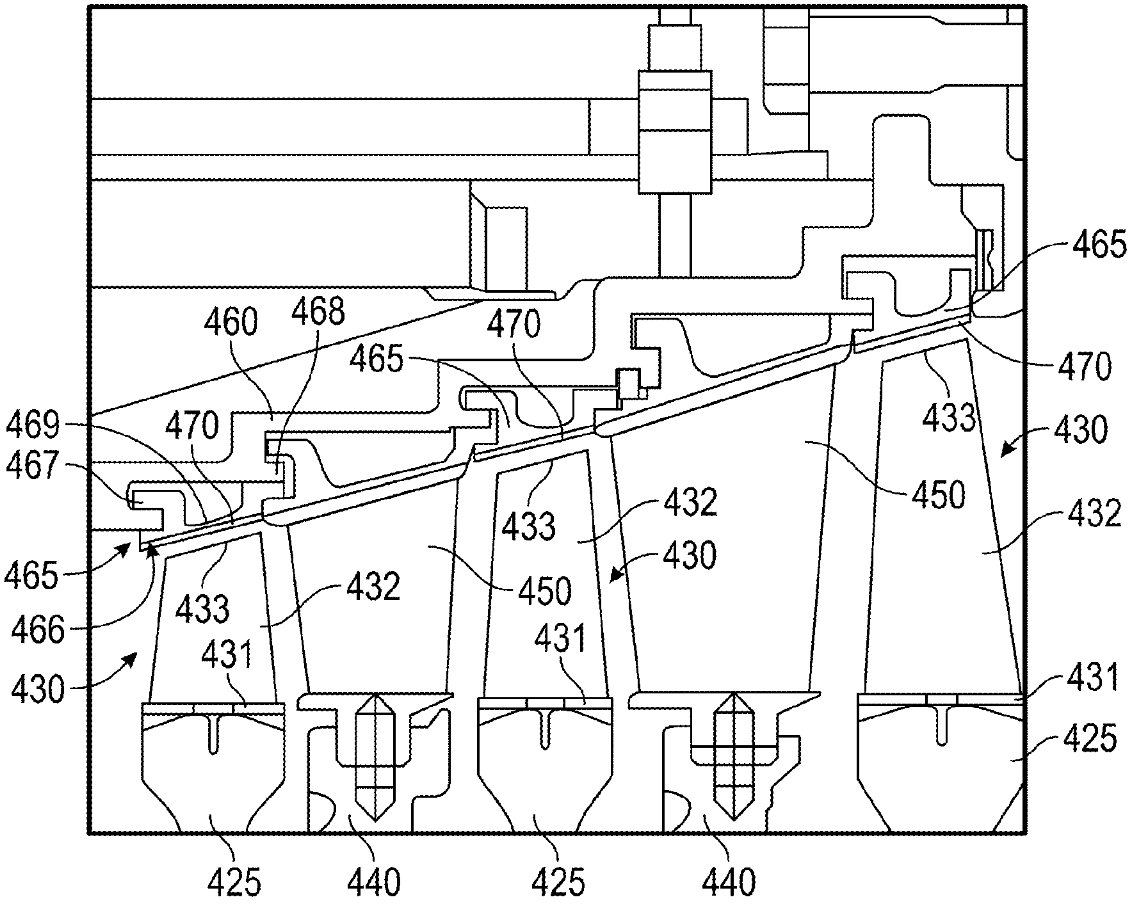
FIG. 2 is a cross-sectional view of a portion of the turbine for the gas turbine engine of FIG. 1.

FIG. 2 is a cross-sectional view of a portion of the turbine 400 for the gas turbine engine 100 of FIG. 1. As illustrated in FIG. 2, each tip shoe 465 is located radially between turbine housing 460 and turbine blades 430. In some embodiments, tip shoes 465 are an annular shape such as a toroid or a hollow cylinder. In other embodiments, tip shoes 465 are a portion or a sector of an annular shape such as a sector of a toroid or a sector of a hollow cylinder; in these embodiments, a plurality of tip shoes 465 form a ring.

Each tip shoe 465 may include shroud portion 469, surface 466, forward hanger 467, and aft hanger 468. Surface 466 may be a cylindrical surface, a portion of a cylindrical surface, or a sector of a cylindrical surface. Shroud portion 469 or a plurality of shroud portion 469 may form a ring or hollow cylinder. Surface 466 may be a radially inner surface of shroud portion 469.

Forward hanger 467 may extend radially outward and axially forward. Forward hanger 467 may connect to or interface with turbine housing 460. Aft hanger 468 may extend radially outward and axially aft. In some embodiments, aft hanger 468 connects to the turbine nozzle 450 adjacent and aft of tip shoe 465. In other embodiments tip shoe 465 connects to housing housing 460.

Each turbine blade includes a blade platform 431, a blade root (not shown), and an airfoil 432. The blade root extends radially inward from the blade platform 431 and connects the turbine blade 430 to the turbine disk 425. The airfoil 432 extends radially outward from the blade platform 431. The airfoil includes a blade tip 433, the radially outer portion of the airfoil 432. A shroud is generally located radially outward and adjacent blade tip 433. In the embodiment illustrated, the shroud is shroud portion 469 of tip shoe 465. In other embodiments, turbine housing 460 includes the shroud. The blade tip 433 may be a bare metal tip. The radially inner portion of turbine nozzles 450 may connect to or be supported by turbine diaphragms 440.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, alloy x, INCONEL, WASPALOY, RENE alloys, HAYNES alloys, alloy 188, alloy 230, INCOLOY, MP98T, TMS alloys, and CMSX single crystal alloys.

The shroud or shrouds, such as tip shoes 465, may be located radially outward from the turbine blades 430. Each shroud includes an abradable coating 470. The abradable coating 470 is located and applied to surface 466, the radially inner surface of tip shoes 465. Abradable coating 470 is applied to the shroud to be adjacent the blade tips 433.

Figure 3:
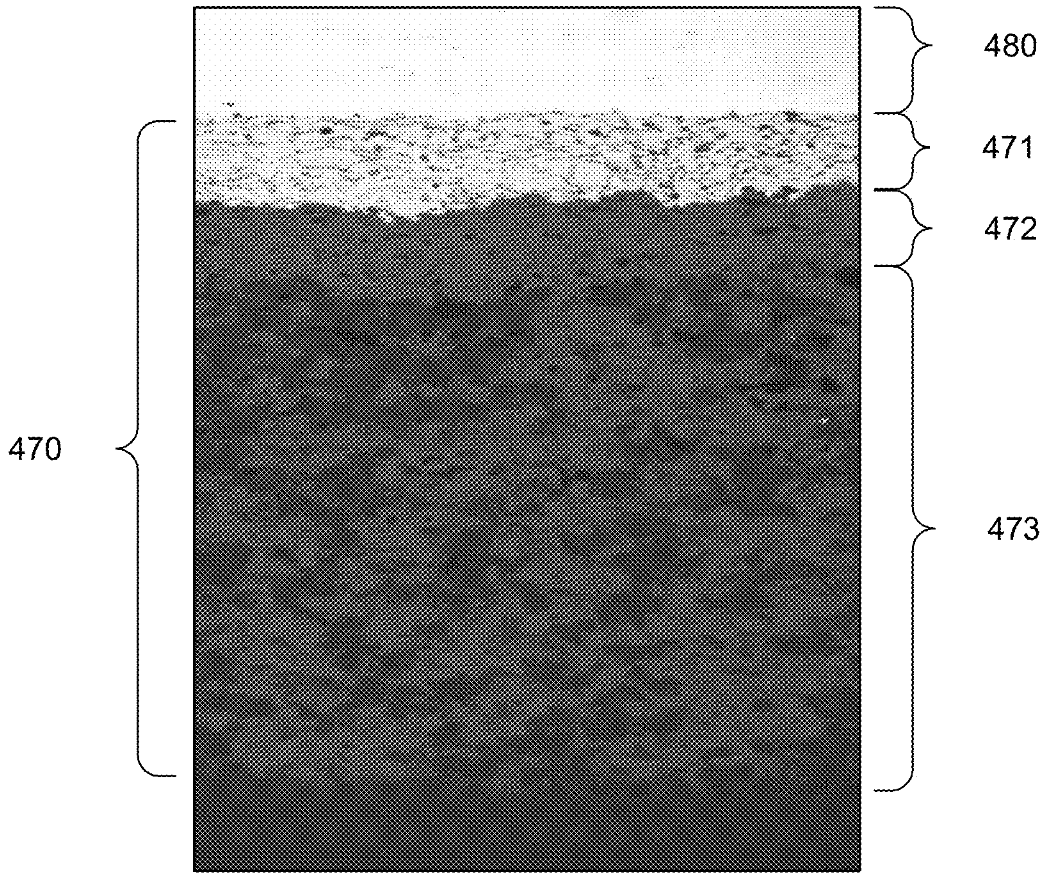
FIG. 3 is a greatly magnified cross-sectional view of the abradable coating for the tip shoes of FIG. 2.

FIG. 3 is a greatly magnified cross-sectional view of the abradable coating 470 for the tip shoes 465 of FIG. 2. As illustrated, the abradable coating 470 is applied to a substrate 480. The substrate 480 may be, for example, a shroud, a tip shoe 465, turbine housing 460, a compressor tip shoe, or a compressor housing. As illustrated in FIG. 3, only the upper or outer portion of the substrate 480 is shown. The overall thickness of abradable coating 470 may be least 1.524 millimeters (60 thousandths of an inch) in one embodiment. In another embodiment, the overall thickness of abradable coating 470 is up to 1.778 millimeters (70 thousandths of an inch). In yet another embodiment, the overall thickness of abradable coating 470 is from 1.524 millimeters (60 thousandths of an inch) to 1.778 millimeters (70 thousandths of an inch). Other thicknesses may be used as required or preferred.

Abradable coating 470 includes a bond coat 471, an intermediate layer 472, and a porous layer 473. Bond coat 471 may be applied directly to substrate 480. Bond coat 471 may be a metal coating, such as an MCrAlY material. In the context of this application, MCrAlY means a metal coating in which M may include nickel, cobalt, or both; Cr includes chromium; Al includes aluminum; and Y includes yttrium. The bond coat 471 may be from 0.152 millimeters (6 thousandths of an inch) to 0.229 millimeters (9 thousandths of an inch).

Intermediate layer 472 may be applied to bond coat 471. Intermediate layer 472 includes a ceramic material. The ceramic material may include yttria stabilized zirconia, such as 6-8% yttria stabilized zirconia (8YSZ). Intermediate layer may be 0.051 millimeters (2 thousandths of an inch) to 0.381 millimeters (15 thousandths of an inch). The porosity of intermediate layer 472 may be the result of the application process without injecting a fugitive material with the ceramic material. The porosity of intermediate layer 472 may be less than the porosity of porous layer 473.

Porous layer 473 may be applied to intermediate layer 472. Porous layer 473 also includes a ceramic material. The ceramic material may include yttria stabilized zirconia, such as 8YSZ. Porous layer 473 and intermediate layer 472 may have the same ceramic material, such as 8YSZ. In one embodiment, porous layer 473 is at least 0.127 millimeters (5 thousandths of an inch). In another embodiment, porous layer 473 is from 0.127 millimeters (5 thousandths of an inch) to 1.524 millimeters (60 thousandths of an inch). In yet another embodiment, porous layer 473 is at least 1.016 millimeters (40 thousandths of an inch). In another embodiment, porous layer 473 is from 1.016 millimeters (40 thousandths of an inch) to 1.524 millimeters (60 thousandths of an inch). In some embodiments, porous layer 473 is thicker than intermediate layer 472.

Porous layer 473 may be applied with a fugitive material to increase the porosity of porous layer 473. The proportion of the fugitive material used can be selected to define or achieve the desired porosity. For example, in one embodiment, after the fugitive material is burned off, the porosity is greater than 35% of the volume of porous layer 473. In another embodiment, the porosity is between 35% to 50% of the volume of porous layer 473 after the fugitive material is burned off. In yet another embodiment, the volume of porous layer 473 is between 45% and 50% of the volume of porous layer 473 after the fugitive material is burned off. The fugitive material may be a polymer such as polyester. The fugitive material may be removed by furnace or by operating exposure.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 320 via fuel injector 310 and ignited. After the combustion reaction, energy is then extracted from the combusted fuel/air mixture via the turbine 400 by each stage of the series of turbine disk assemblies 420. Exhaust gas 90 may then be diffused in exhaust diffuser 520 and collected, redirected, and exit the system via an exhaust collector 550. Exhaust gas 90 may also be further processed (e.g., to reduce harmful emissions, and/or to recover heat from the exhaust gas 90).

Operating efficiency of a gas turbine engine generally increases with a higher combustion temperature. Thus, there is a trend in gas turbine engines to increase the combustion temperatures. Combustion gases exiting combustion chamber 390 and entering the turbine 400 may be 1000 degrees Fahrenheit or more. To operate at such high temperatures the various components of turbine 400 may be coated with a thermal barrier coating to protect the various components from the hot combustion gases.

Operating efficiency also depends on a tight seal between rotating components and the static components. This seal may be established by coating the static components, such as tip shoes 465, with an abradable material and allowing the rotating components, such as turbine blades 430, to cut or abrade away a radially inner portion of the coating. This abradable seal may reduce the amount of air or prevent air from leaking between the blade tips 433 and the tip shoes 465.

Abradable coating 470 may act both as a thermal barrier and as an abradable seal. The thickness and porosity of porous layer 473 may provide a sufficient thermal barrier resistance and thermal cycle resistance. Porous layer 473 with a porosity above 35% may reduce the wear of turbine blades 430 with a bare metal tip or turbine blades 430 without an abrasive ceramic tip. Abrasive ceramic tips for turbine blades 430 may be expensive. The use of turbine blades 430 with bare metal tips or without abrasive ceramic tips may reduce the costs of the turbine blades 430 resulting in a decrease in manufacturing costs and repair costs.

The thicknesses of bond coat 471 and intermediate layer 472 provide structural support to porous layer 473. The intermediate layer 472 may improve the durability of the abradable coating, and the combination of the thicknesses and porosities of bond coat 471, intermediate layer 472, and porous layer 473 may provide the durability needed for abradable coating 470 to be used in gas turbine engine 100.

Industrial gas turbine engines typically include better filtration compared to aerospace gas turbine engine based designs. Erosion may not be as significant as a factor in industrial gas turbine engine coating systems as it is in other industries. An industrial gas turbine engine may not require the abrasion resistant components that aerospace gas turbine engine based designs require.

Abradable coating 470 may be applied by air plasma spray or by other known application techniques, inter alia, low pressure plasma spray, high velocity oxy-fuel thermal spraying, electron beam physical vapor deposition, or vacuum plasma spray. Prior to applying abradable coating 470 to substrate 480, substrate 480 may be prepared for the application by cleaning, masking and grit blasting to remove any contaminants. Grit blasting may be by aluminum oxide grit blasting.

After preparing substrate 480 the bond coat 471 is applied to the substrate. The bond coat 471 may be heat treated before or after intermediate layer 472 and porous layer 473 are applied. Intermediate layer 472 is then applied to the bond coat 471. Porous layer 473 is then applied to the intermediate layer 473. Porous layer 473 may be formed by applying the ceramic material and the fugitive material simultaneously to the intermediate layer 473. The ceramic material may be injected into the spraying or application mechanism through a first port while the fugitive may be injected into the spraying or application mechanism through a second port. After applying porous layer 473 the fugitive may be removed by heat treatment or during operation of gas turbine engine 100.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular abradable coating, it will be appreciated that the abradable coating in accordance with this disclosure can be implemented in various other configurations, can be used with various other types of gas turbine engines, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. An abradable coating for a gas turbine engine, comprising:

a bond coat applied to a substrate, the bond coat including
  a metal coating, and
  a thickness from 0.152 millimeters to 0.229 millimeters;
an intermediate layer applied to the bond coat, the intermediate layer including
  a ceramic material, and
  a thickness from 0.051 millimeters to 0.381 millimeters; and
a porous layer applied to the intermediate layer, the porous layer including
  a porous ceramic material,
  a porosity greater than thirty-five percent of a volume of the porous layer, and
  a thickness from 0.127 millimeters to 1.524 millimeters.

2. The abradable coating of claim 1, wherein the porosity of the porous layer is between thirty-five percent to fifty percent of the volume of the porous layer.

3. The abradable coating of claim 1, wherein the thickness of the porous layer is from 1.016 millimeters to 1.524 millimeters.

4. The abradable coating of claim 3, wherein a thickness of the abradable coating is from 1.524 millimeters to 1.778 millimeters.

5. The abradable coating of claim 1, wherein the porous ceramic material includes yttria stabilized zirconia.

6. The abradable coating of claim 5, wherein the yttria stabilized zirconia is 6-8% yttria stabilized zirconia.

7. The abradable coating of claim 1, wherein the porosity of the porous layer is formed by applying the porous layer to the intermediate layer with a fugitive material and burning off the fugitive material.

8. The abradable coating of claim 7, wherein the fugitive material is polyester.

9. The abradable coating of claim 1, wherein the ceramic material includes yttria stabilized zirconia.

10. The abradable coating of claim 1, wherein the metal coating includes an MCrAlY material.

11. A shroud for a gas turbine engine including the abradable coating of claim 1.

12. An abradable coating for a shroud of a gas turbine engine located adjacent rotor blades, comprising:

a bond coat applied to the shroud, the bond coat including an MCrAlY material and including a thickness from 0.152 millimeters to 0.229 millimeters;

an intermediate layer applied to the bond coat, the intermediate layer including yttria stabilized zirconia and including a thickness from 0.051 millimeters to 0.381 millimeters; and a porous layer applied to the intermediate layer, the porous layer including yttria stabilized zirconia, a porosity between thirty-five percent to fifty percent of the volume of the porous layer, and a thickness of at least 1.016 millimeters.

13. The abradable coating of claim 12, wherein the thickness of the porous layer is from 1.016 millimeters to 1.524 millimeters.

14. The abradable coating of claim 13, wherein a thickness of the abradable coating is from 1.524 millimeters to 1.778 millimeters.

15. The abradable coating of claim 12, wherein the porosity of the porous layer is formed by applying the porous layer to the intermediate layer with a fugitive material and burning off the fugitive material.

16. The abradable coating of claim 15, wherein the fugitive material is a polymer.

17. A tip shoe for a gas turbine engine including the abradable coating of claim 12.

18. A gas turbine engine, comprising:

a rotor assembly including a rotor disk, and a plurality of rotor blades coupled to the rotor disk, each rotor blade of the plurality of rotor blades including an airfoil with a bare metal blade tip;

a shroud located radially outward from the rotor assembly, the shroud including a surface located adjacent the blade tips of the plurality of rotor blades; and an abradable coating applied to the surface of the shroud, the abradable coating including a bond coat applied to the shroud, the bond coat including a metal coating, an intermediate layer applied to the bond coat, the intermediate layer including a ceramic material, and a porous layer applied to the intermediate layer, the porous layer including a porous ceramic material and including a porosity between thirty-five percent and fifty percent of the volume of the porous layer.

19. The abradable coating of claim 18, wherein a thickness of the abradable coating is from 1.524 millimeters to 1.778 millimeters, the thickness of the bond coat is from 0.152 millimeters to 0.229 millimeters, the thickness of the intermediate layer is from 0.051 millimeters to 0.381 millimeters, and the thickness of the porous layer is at least 0.127 millimeters.

20. The abradable coating of claim 18, wherein the bond coat includes an MCrAlY material, the intermediate layer includes yttria stabilized zirconia, and the porous layer includes yttria stabilized zirconia.

* * * * *